United States Patent [19]
Jouve

[11] 3,962,905

[45] June 15, 1976

[54] FLUID LEAK DETECTION PROCESS AND INSTALLATION

[75] Inventor: Philippe Jouve, Pontacq, France

[73] Assignee: Societe Anonyme dite: Societe Nationale des Gaz du Sud-Ouest, Pau, France

[22] Filed: Jan. 6, 1975

[21] Appl. No.: 538,565

[30] Foreign Application Priority Data
Jan. 8, 1974 France .............................. 74.00617

[52] U.S. Cl............................................. 73/40.5 R
[51] Int. Cl.² ........................................ G01M 3/28
[58] Field of Search................. 73/40.5; 48/193; 340/242

[56] References Cited
UNITED STATES PATENTS

| | | | |
|---|---|---|---|
| 2,784,373 | 3/1957 | Lawrence et al. .................. | 340/242 |
| 3,664,357 | 5/1972 | Kreis.................. | 73/40.5 |
| 3,723,987 | 3/1973 | Barone, Jr. et al. .................. | 73/40.5 |

FOREIGN PATENTS OR APPLICATIONS

| | | | |
|---|---|---|---|
| 2,055,062 | 5/1971 | Germany ............................ | 73/40.5 |

*Primary Examiner*—S. Clement Swisher
*Attorney, Agent, or Firm*—Lewis H. Eslinger; Alvin Sinderbrand

[57] ABSTRACT

The invention relates to a process and installation for detecting a fluid leak in a pipe sub-divided into sealable sections by a series of isolating valves arranged at each end of a section.

As a result of this process and installation all normal pressure fluctuations occurring in the pipe can be followed without starting off the isolating valves but in the case of an accidental leak when the pressure drop exceeds the predetermined threshold value within a predetermined time, the isolating valves in the pipe are reliably actuated.

13 Claims, 6 Drawing Figures

FLUID LEAK DETECTION PROCESS AND INSTALLATION

BACKGROUND OF INVENTION

The present invention has for its object a process and installation for the detection of a fluid leak in a pipe sub-divided into sections sealable by a series of isolating valves arranged at each end of a section. According to this process a comparison is constantly made between the value of a pressure difference resulting from the difference between a reference pressure and the true pressure in the pipe and a predetermined pressure difference threshold value and as soon as the pressure difference threshold is passed by the true pressure difference a new comparison cycle starts between the true instantaneous pressure difference on the one hand and the said pressure difference threshold value on the other hand and the closing of the isolating valves of the pipe sections in question is initiated if the threshold value is again passed during a predetermined time starting from the beginning of the new comparison cycle.

Such a detection process is known from French Patent No. 1,482,085. For establishing the true pressure difference this known process uses a reference pressure supplied by a pressure source constituted for example by a vessel and connected on the one hand to the intake of a differential pressure gauge and on the other periodically to the pipe in such a way that the reference fluid pressure is made equal to that of the pipe whenever the threshold is exceeded. The other intake of the differential pressure gauge is connected to the pipe.

BRIEF SUMMARY OF INVENTION

The problem of the present invention is to provide a process for detecting a fluid leak in a pipe and which makes a supplementary fluid vessel unnecessary, allowing any pressure fluctuations in the pipe other than those caused by accidental leaks without initiating the operation of the isolating valves of the pipe.

According to the invention this problem is solved in that the reference used is the pressure in the pipe at the start of each comparison cycle. This measurement is stored in an electronic memory store.

Therefore, the pipe pressure can vary in the pipe without initiating the operation of the isolating valves provided that these variations do not exceed a predetermined threshold during the predetermined period of time, whereby the reference pressure is always relative to and constituted by that existing at the start of each comparison cycle in the pipe.

The invention also relates to an installation for detecting a fluid leak in pipe sub-divided into sealable sections delimited by isolating valves, whereby the installation has means for determining the value of a pressure difference constituted by the difference between the measurement of the stored pressure and that of the pressure existing in the pipe and for cyclically comparing the pressure difference value with a predetermined threshold value, an electrical control circuit for the isolating valves, a first switch mounted in the control circuit and brought into the conduction position during a predetermined period by the said comparison means as soon as the pressure difference reaches the predetermined threshold value and a second switch mounted in series with and downstream of the first switch brought into the conduction position by comparison means and by the signal controlling the first switch as soon as the pressure difference reaches the said threshold value and which can be maintained in the conduction position during a predetermined period of time.

According to the invention an installation of the above-mentioned type comprises a pressure sensor supplying a direct current voltage proportional to the instantaneous pressure in the pipe and an analog store connected to the pressure sensor via a contactor and able to record a voltage value corresponding to the pressure in the said pipe at the start of each comparison cycle and to reproduce it at its output throughout the whole cycle, wherein the means for determining the pressure difference are constituted by a subtraction stage whose two inputs are connected to the output of both the pressure sensor and the analog store, wherein the means for comparing the said pressure difference with a predetermined threshold value are constituted by an electronic comparator which permanently receives at its input a signal corresponding to the said pressure difference and emitting an output signal as soon as the threshold value is reached, wherein the assembly of the two switches is constituted by a first monostable circuit connected to the output of the comparator and supplying, on receiving a signal from the comparator, a pulse of fixed duration or width ($T_1$), by a second monostable circuit connected to the output of the first monostable circuit and supplying, on receiving the pulse from the first monostable circuit, a pulse of a fixed duration or width ($T_0$) of a value at least several times greater than that from the first monostable circuit and by an AND gate whereof one of the inputs is connected to the output of the first monostable circuit and whereof the second input is connected to the output of the second monostable circuit and whereof the output is connected via a power amplifier to the second control circuit and wherein the output of the first monostable circuit is also connected to the relay of the said contactor.

In this way an installation of great reliability is obtained making it possible to follow all normal pressure variations occurring in the pipe without initiating the operation of the isolating valves. However, this installation comes into operation whenever the pressure drops exceed the predetermined threshold within a predetermined period of time.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims. In the drawings show:

DETAILED DESCRIPTION OF THE PREFERRED EMBODIMENTS

Figure 1:
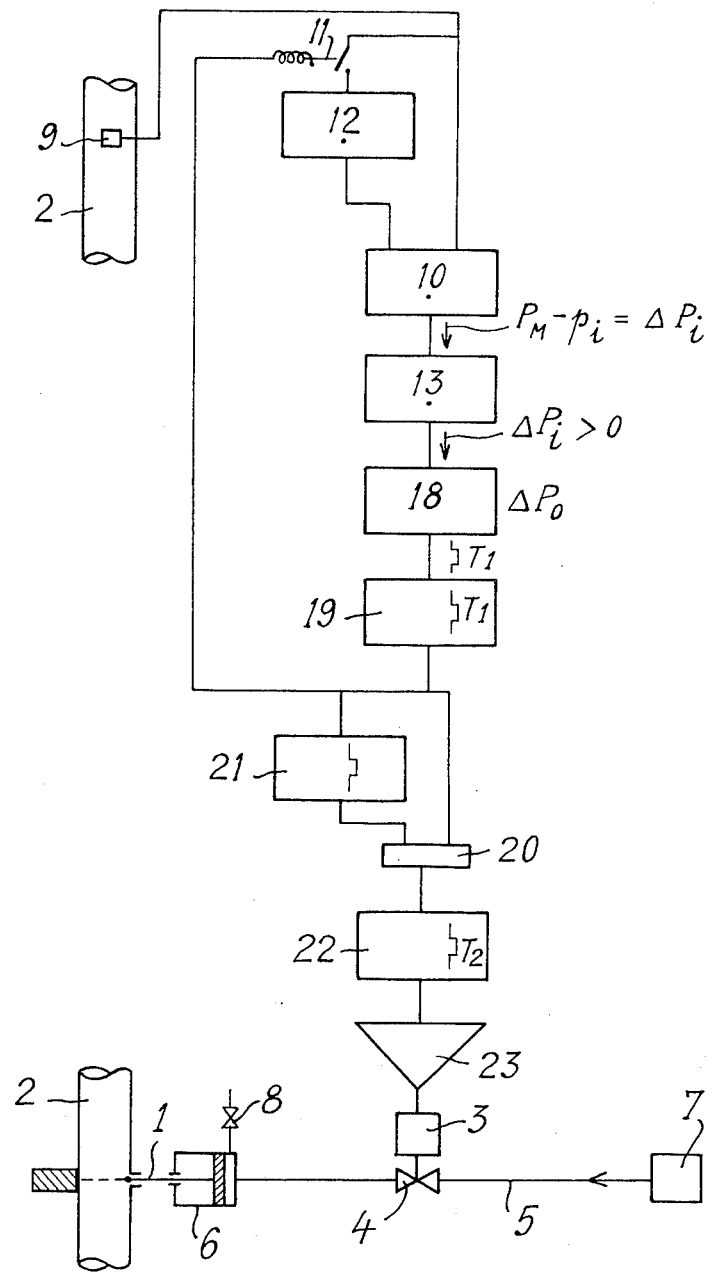
FIG. 1 a schematic block diagram of the installation according to the invention, FIG. 2 an assembly detail of a control stage used in the installation, FIG. 3 several diagrams illustrating the operation over a period of time of the installation.

The installation as shown in FIG. 1 serves to actuate at least on isolating valve 1 provided on a section of pipe 2 through which is conveyed a fluid. Advantageously, the installation does not act directly on isolating valve 1 but instead on relay 3 of an electrovalve 4 inserted in the pneumatic control circuit 5 of pneumatic motor 6 of the said isolating valve 1 between on the one hand the said motor 6 and on the other a compressed air source 7. Motor 6, for example, comprises a pneumatic jack and has a manually controlled drain valve 8. The installation as shown in FIG. 1 has a pressure sensor 9 arranged in the particular pipe section 2 and able to supply at its output a direct current voltage proportional to the instantaneous pressure, $p_i$, existing in the pipe section. The output of this sensor is connected on the one hand to the input of a subtraction stage 10 and on the other via a relay contactor 11 to the input of an analog memory store 12.

Relay contactor 11 is generally in the open position and when cyclically closed during a short time permits the storing in the analog store of the measurement of the pressure existing at that time in the section of pipe 2, $P_M$. The outlet of the analog store is connected to the second input of subtraction stage 10 and constantly applies thereto a voltage corresponding to the stored pressure value. By means of the input connected to the output of sensor 9, the subtraction stage 10 permanently receives a direct current voltage proportional at any time to the instantaneous pressure $p_i$ existing in the section of pipe 2. At the outlet, subtraction stage 10 permanently supplies a voltage corresponding to the difference between on the one hand the stored pressure value $P_M$ in the analog store 12 and on the other the instantaneous pressure $p_i$. This difference between the two pressures $p_i$ represents the variation over a period of time of pressure $p_i$ in the section of pipe 2.

As the pressure variation in the section of pipe 2 can also be positive, i.e. the pressure increases in the said pipe and this pressure rise cannot be utilized for detecting a leak, it is advantageous to eliminate the signals corresponding to a pressure increase by means of a control stage 13 whose input is connected to the output of the subtraction stage 10. This control stage 13 has the function of eliminating all negative values of $\Delta p_i$, whereby these values occur when the instantaneous pressure $p_i$ is greater than the stored pressure value $P_m$ serving as the reference pressure. Thus this control stage solely supplies signals $\Delta p_i$ which are greater than zero.

Figure 2:
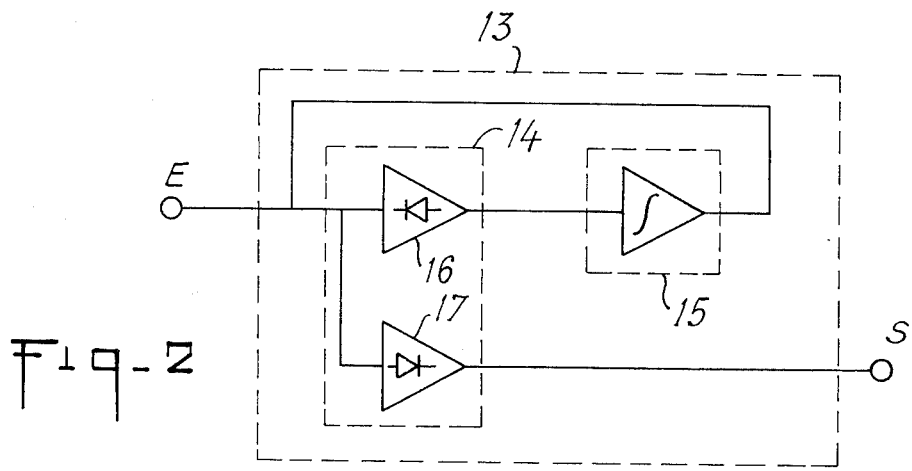
Figure 3A:
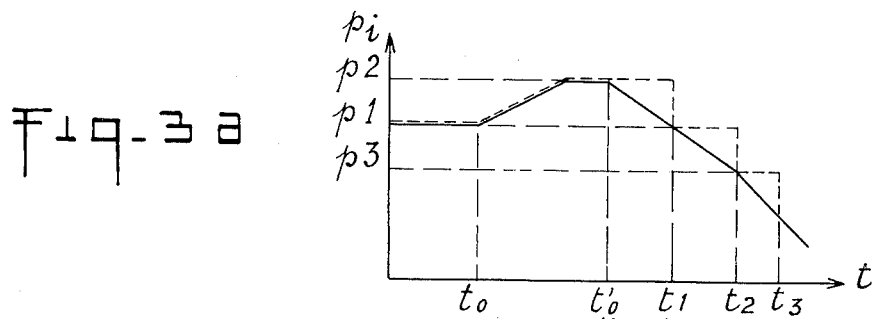
Figure 3B:
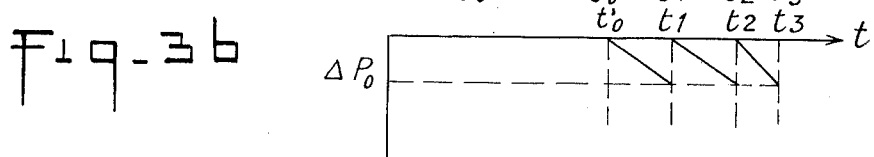
Figure 3C:
Figure 3D:

FIG. 2 shows a special embodiment of control stage 13 which starting from input E comprises two amplifier stages 14 and 15 whereof the first 14 has two separator-rectifiers 16 and 17. The input of the latter is connected to the input E of control stage 13. The two separator-rectifiers 16 and 17 are mounted in opposition in such a way that the first 16 only permits the passage of signals or voltages having a negative value and a second 17 only permits the passage of voltages or signals having a positive value. Obviously, the negative signals correspond to a pressure rise in the section of pipe 2 and the positive signals correspond to a pressure drop in the said section of pipe 2. The second amplifier stage 15 is connected to the output of separator-rectifier 16 and comprises an integrator whose output is returned to the input of control stage 13. Thus when a negative signal is applied to this input it is transformed by the integrator stage 15 into a positive signal of the same absolute magnitude in such a way that the signal is substantially cancelled out by the relooping of the output of integrator stage 15 with the input of control stage 13. However, if a positive signal is applied to the input E of stage 13 this signal can pass through the second separator-rectifier 17 to the output S of control stage 13.

To control stage 13 is connected the input of an electronic comparator 18 which can be regulated within a range of predetermined threshold value $\Delta P_0$. For information purposes, it is pointed out that the threshold value $\Delta P_0$ can for example vary between 0.5 and 5 bars. When the signal corresponding to the differential pressure $\Delta P_i$ exceeds the predetermined threshold value $\Delta P_0$, comparator 18 supplies at its output a signal applied to the input of a first monostable circuit 19 which in turn supplies a pulse of fixed width or duration $T_1$ for example of the order of a few seconds and preferably less than 5 seconds. The output of this first monostable circuit is connected both to the first input of an AND gate 20, to the winding of the relay contactor 11 and the input of a second monostable circuit 21 which, when it receives pulse $T_1$ itself supplies a pulse $T_0$ of fixed duration or width but at least several times greater than the duration of pulse $T_1$ and preferably of the order of 60 to 120 seconds. The output of the second monostable circuit 21 is connected to the second input of the AND gate 20. The output of AND gate 20 is connected to the input of a third monostable circuit 22 which when triggered by the opening of AND gate 20 emits a pulse $T_2$ of such a duration that it excites, via a power amplifier 23, relay 3 of electrovalve 4 mounted in the pneumatic control circuit of motor 6 of isolating valve 1.

Hereinafter the operating procedure for the installation according to the invention will be described. However, it is pointed out that the general principle concerning the detection of any break in the pipe consists of the measurement of the pressure differential of the pipe. If the pipe breaks there is firstly a sudden pressure drop which is followed by a drop whose negative differential is roughly constant. The value of this differential depends on the dimensions of the opening made in the pipe. When the gaseous fluid pipe is operated normally both positive and negative normal pressure variations occur. It is therefore important that the triggering threshold for actuating the isolating valve is greater than the highest absolute value of the negative differential which can be encountered in normal operation. In connection with positive pressure differentials control stage 13 has been provided for compensating these.

If it is assumed that time $t_0$ (cf. diagram a) in FIG. 3 where the ordinate represents the pressure $p_i$ in the section of pipe 2 and the abscissa represents the time $t$) a pressure $p_1$ exists in the section of pipe 2 which starts to rise to a value of $p_2$ and after having been constant for a certain time starts to fall from time $t'_0$.

It is also assumed that as soon as control stage 13 notes a pressure rise it perfectly compensates the positive differentials.

Thus the difference $P_M - p_i = \Delta P_i$, is artificially maintained at zero if the pressure $p_i$ drops at time $t'_0$. Thus initially there is a zero value $\Delta P_i$ on the second output of the control stage. In comparator 18 which receives the signal $\Delta P_i$ this pressure difference value is compared with a predetermined threshold value $\Delta P_0$. This pressure difference reaches the threshold $\Delta P_0$ at time $t_1$ (cf. FIG. 3b where the ordinate represents the value of the pressure difference $\Delta P_i$ and the abscissa represents the time $t$). At time $t_1$ the comparator triggers the first monostable circuit 19 whose output pulse of duration $T_1$ instantaneously excites the relay of contactor 11, resets to zero the store of integrator 15 and appears in the first input of AND gate 20. The end of the pulse of monostable circuit 19 causes the triggering of the second monostable circuit 21 which emits a pulse of duration $T_0$, for example of the order of 60 seconds and applies it to the second input of the AND gate 20 in such a way that this gate is open. As soon as pulse $T_1$ has excited relay contactor 11, analog memory store 12 is reset. As from this new comparison cycle analog memory store 12 applies a constant voltage corresponding to pressure $p_1$ to the corresponding input of subtraction stage 10 whilst sensor 9 applies the decreasing instantaneous pressure $\Delta p_i$ to the other input of the said subtraction stage 10. While pressure difference $\Delta P_i$ increases, the pulse $T_0$ disappears at the first input of AND gate 20 (cf. FIG. 3c). Thus AND gate 20 is once again closed. At time $t_2$ the threshold value $\Delta P_0$ is again reached by pressure difference $\Delta P_i$. Therefore, the first monostable circuit 19 is again triggered and applies a pulse $T_1$ to the second input of AND gate 20 which is closed at its input and excites the relay of contactor 11. Its de-energisation triggers the second monostable circuit 21. Thus the second monostable circuit 21 applies a pulse $T_0$ to the second input of AND gate 20 which is again opened. In analog store 12, under the action of pulse $T_1$ the previously recorded pressure value $p_1$ is erased and then the value of pressure $p_3$ is occurring at time $t_2$ in pipe 2 is recorded. This pressure $p_3$ which then serves as the new reference pressure is applied in the form of a constant voltage to the corresponding input of subtraction stage 10 whose other input receives as previously a direct current voltage corresponding to the instantaneous pressure $p_i$ existing in pipe 2. The AND gate 20 remains open for as long as pulse $T_0$ exists. In the meantime, at time $t_3$ the pressure difference $\Delta P_i$ has again reached the threshold value $\Delta P_0$. This time occurs within the pulse duration $T_0$ released at time $t_2$. The first monostable circuit 19 which is therefore triggered at time $t_3$ then emits a new pulse $T_1$ which finds AND gate 20 open and can therefore directly trigger via the said gate the third monostable circuit 22 which via its pulse $T_2$ occurring at time $t_3$ excites via power amplifier 23, the relay 3 of electrovalve 4 (cf. FIG. 3d). Electrovalve 4 then opens permitting the power source 7 (compressed air or gas) to supply the piston of jack 6 which then closes the isolating valve 1. Therefore, the section of pipe 2 wherein goes a significant gas leak is separated from the rest of the pipe.

While there has been described and illustrated the preferred embodiments of the invention, it is to be understood that these are capable of variation and modification and it is therefore not desired to be limited to the precise details set forth but to include such modifications and alterations as fall within the scope of the appended claims.

What is claimed is:

1. A process for the detection of a fluid leak in a pipe sub-divided into sealable sections by a series of isolating valves arranged at each end of a section, said process comprising the steps of continuously detecting the instantaneous gas pressure in the pipe, producing a first output signal representative of the instantaneous pressure in the pipe; performing a first comparison cycle including the steps of continuously determining the difference in pressure between a reference signal representative of a reference pressure and the first output signal representative of said instantaneous pressure occurring in the pipe; producing a second output signal proportional to said pressure difference when the reference pressure is greater than the instantaneous pressure; comparing said second output signal with a signal representative of a predetermined pressure difference threshold value; producing a third output signal when the value of said second output signal exceeds the value of said signal representative of a predetermined pressure difference threshold value;

establishing a new reference signal representative of the instantaneous pressure in the pipe in response to said third output signal;

performing a second comparison cycle including all of the steps of the first cycle but using the new reference signal for comparison with said first output signal; and closing at least one of the isolating valves of the pipe if the signal representative of said pressure difference threshold value is again exceeded during said second comparison cycle and within a predetermined time starting from the beginning of the second comparison cycle.

2. A process according to Claim 1, wherein said step of producing the first output signal representative of the instantaneous pressure detected in the pipe comprises the step of producing a voltage signal which is a linear function of said instantaneous pressure.

3. An installation for the detection of a fluid leak in a pipe subdivided into sealable sections delimited by isolating valves comprising, means for determining the difference between a signal representative of a stored pressure and a first output signal representative of the instantaneous pressure in the pipe, said means including pressure sensor means for detecting the actual instantaneous pressure in the pipe and producing said first output signal as a direct current voltage signal proportional to the instantaneous pressure in the pipe, analog storage means connected to said detecting means for selectively storing the instantaneous pressure signal produced by said detecting means and for producing the stored signal as a constant output signal until the stored signal is charged;

means for producing a second output signal when said first output signal has a smaller value than said stored signal, including first comparator means operatively connected to said pressure detecting means and to said storage means for receiving the respective first output and stored signals therefrom and for producing a second output signal proportional to the difference therebetween when the value of said stored signal exceeds the value of said first output signal;

means for cyclically comparing the second output signal with a signal representative of a predetermined pressure difference threshold value including a second comparator means for receiving said second output signal, comparing it to a stored predetermined signal representative of a predetermined pressure difference between said first output signal and the first mentioned stored signal, and producing a third output signal when the value of said second output signal exceeds the value of said stored predetermined signal;

electrical control circuit means for controlling the isolating valves a first switch mounted in the control circuit and brought into the conduction position during a predetermined period by the said comparison means as soon as the pressure difference reaches the predetermined threshold value and a second switch mounted in series with and downstream of the first switch brought into the conduction position by comparison means and by the signal controlling the first switch as soon as the pressure difference reaches the said threshold value and which can be maintained in the conduction position during a predetermined period of time, wherein it comprises a pressure sensor supplying a direct current voltage proportional to the instantaneous pressure in the pipe and an analog store connected to the pressure sensor via a contactor and able to record a voltage value corresponding to the pressure in the said pipe at the start of each comparison cycle and to reproduce it at its output throughout the whole cycle, wherein the means for determining the pressure difference are constituted by a substraction stage whose two inputs are connected to the output of both the pressure sensor and the analog store, wherein the means for comparing the said pressure difference with a predetermined threshold value are constituted by an electronic comparator which permanently receives at its input a signal corresponding to the said pressure difference and emitting an output signal as soon as the threshold value is reached, wherein the assembly of the stop switches is constituted including a first monostable circuit means connected to the output of the second comparator means for supplying, on receiving said third output signal, a pulse signal of fixed duration $(T_1)$, a second monostable circuit means connected to the first monostable circuit means for receiving said pulse signal $(T_1)$ therefrom and for producing at the termination of pulse signal $(T_1)$, a pulse signal of a fixed duration $(T_0)$ of a value at least several times greater than that from the first monostable circuit means, and an AND gate having one of its inputs connected to the output of the first monostable circuit means to receive said pulse signal $(T_1)$ therefrom and its second input connected to the output of the second monostable circuit means to receive said pulse signal $(T_0)$ therefrom; and means responsive to an output signal in said AND gate for closing at least one valve in said pipe; and relay contactor means for selectively operatively connecting said storage means to said detecting means; the output of the first monostable circuit means also being connected to said relay contactor means for operating said relay contactor means to connect said storage means to said detector means thereby to store the first output signal in said storage means when said first monostable circuit produces a pulse signal $(T_1)$ for comparison with the continuously produced first output signal.

4. An installation according to claim 3, wherein said first comparator means includes means for controlling the second output signals emitted by the first comparator means to signals corresponding only to negative values of the pressure differences between the stored signal and said first output signal, whereby this stage only permits the passage of signals whose values correspond to a pressure decrease in the pipe.

5. An installation according to claim 4, wherein said controlling means comprises two amplifier stages whereof the first comprises two separator-rectifiers mounted in parallel and in oppostion and whereof the second comprises an integrator whose input is connected to the output of the separator-rectifier only permitting the passage of positive voltage signals and whereof the output is connected to the input of said controlling means whose output is that of the separator-rectifier which only permits the passage of negative voltage signals.

6. An installation according to claim 3, wherein said means for closing at least one valve includes a power amplifier and between the output of the AND gate and the power amplifier is mounted a third monostable circuit means for supplying a pulse signal $(T_2)$ to said power amplifier when it receives a signal from the AND gate.

7. A method for the detection of a fluid leak in a pipe subdivided into sealable sections by a series of isolating valves arranged at each end of a section comprising the steps of, comparing the pressure difference between a first reference pressure and the true pressure occurring in a pipe section to a predetermined pressure difference threshold value during a first comparison cycle;

performing a second comparison cycle as soon as said threshold value is exceeded and comparing the pressure difference between a second reference pressure and the true pressure occurring in said pipe section to said pressure difference threshold value, wherein each said reference pressure is the pressure occurring in said pipe section at the start of the corresponding comparison cycle; and closing the isolating valves of said pipe section if said pressure difference threshold value is exceeded during a predetermined time interval following the start of said second comparison cycle.

8. A method as set forth in claim 7 including the step of storing the pressure occurring in said pipe section at the start of each comparison cycle in a memory as the reference pressure for that comparison cycle.

9. A method as set forth in claim 7 including the step of transforming the true pressure occurring in said pipe section into a voltage which is a linear function of said true pressure.

10. An installation for the detection of a fluid leak in a pipe subdivided into a sealable section delimited by isolating valves comprising, pressure sensor means for supplying a D-C voltage proportional to the pressure occurring in a pipe section;

analog storage means connected to said pressure sensor means via switch means for recording a voltage value representative of the pressure occurring in said pipe section at the moment of actuation of said switch means in response to a first control signal;

subtracting means having a first input connected to said pressure sensor and second input connected to said analog storage means or delivering on its putput a signal representative of the difference between the voltage value stored in said analog storage means and the voltage delivered by said pressure sensor means;

comparator means connected to the output means of said subtracting means for delivering a signal when the output signal of said substracting means reaches a predetermined value;

first monostable circuit means connected to said comparator means for delivering on its output a first pulse of fixed duration in response to said signal delivered by said comparator means, said first monstable circuit means being connected to said switch means for delivering thereto said first pulse as first control signal;

second monostable circuit means connected to said first monostable circuit means for delivering a second pulse in response to said first pulse, and after the end of said first pulse; said second pulse having a fixed duration at least several times greater than the duration of said first pulse; and An AND gate having two inputs respectively connected to the outputs of said first and second monostable circuit means; a third monostable circuit means connected to the output of said AND gate for delivering a second control signal in response to a signal delivered by said AND gate;

a power amplifier having its input connected to the output of said third monostable circuit means and an electrical control circuit connected to the output of said power amplifier for closing the isolating valves of said pipe section in response to said control signal.

11. An installation as set forth in claim 10 including control stage means serially connected between said subtracting means on said comparator for allowing only the passage of output signals delivered by said subtracting means and corresponding to a decrease of the pressure in said pipe section.

12. An installation as set forth in claim 11 wherein said control stage means comprises a first amplifier stage including a first and a second rectifying separator mounted in parallel and in opposition; and a second amplifier stage including integrator means; said first rectifying separator only permitting the passage of positive signals and being serially connected between said subtracting means output and the input of said integrator means; said second rectifying separator only permitting the passage of negative signals and being serially connected between said subtracting means output and said comparator means input; and said subtracting means output being connected to the output of said integrator.

13. An installation as set forth in claim 12 including pneumatic control circuit means for controlling said isolating valves comprising an electrovalve mounted between a compressed fluid source and a pneumatic motor for actuating said isolating valve; said electrovalve comprising relay means connected to said power amplifier output; said motor including a manually controlled drain valve.

* * * * *